(12) United States Patent
Kananghinis et al.

(10) Patent No.: US 7,870,004 B2
(45) Date of Patent: *Jan. 11, 2011

(54) METHOD OF MODELING FRAMEWORKS AND ARCHITECTURE IN SUPPORT OF A BUSINESS

(75) Inventors: John Kananghinis, Wellington (NZ);
Daniel W. Phelon, Wellington (NZ);
Colin T. Hebden, Crowthorne (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1686 days.

This patent is subject to a terminal disclaimer.

(21) Appl. No.: 10/606,661

(22) Filed: Jun. 25, 2003

(65) Prior Publication Data

US 2004/0059611 A1 Mar. 25, 2004

Related U.S. Application Data

(63) Continuation-in-part of application No. 09/378,514, filed on Aug. 20, 1999, now Pat. No. 7,162,427.

(51) Int. Cl.
*G06Q 10/00* (2006.01)
(52) U.S. Cl. ...................................................... 705/1.1
(58) Field of Classification Search ........................ None
See application file for complete search history.

(56) References Cited

U.S. PATENT DOCUMENTS

| | | | |
|---|---|---|---|
| 5,406,477 A | 4/1995 | Harhen | |
| 6,134,706 A | 10/2000 | Carey et al. | |
| 6,233,537 B1 | 5/2001 | Gryphon et al. | |
| 6,249,769 B1 * | 6/2001 | Ruffin et al. | 705/7 |
| 6,311,144 B1 | 10/2001 | Abu El Ata | |
| 6,442,557 B1 * | 8/2002 | Buteau et al. | 707/102 |
| 6,560,569 B1 | 5/2003 | Abu El Ata | |
| 7,290,275 B2 * | 10/2007 | Baudoin et al. | 726/1 |
| 2004/0010772 A1 * | 1/2004 | McKenna et al. | 717/101 |

FOREIGN PATENT DOCUMENTS

JP 09-319796 A 12/1997

OTHER PUBLICATIONS

Hurwitz, et al., E-Business Software (toward virtual companies) Industry Trend or Event), DBMS, Jul. 1998, vol. 11, No. 8, p. 8.
"MatrixOne Creates Intelligent Collaborative Commerce; Adaptive, Proactive, Secure Solutions Define Competitive Success for e-Commerce"; Business Wire, Sep. 11, 2000, p. 2799.

* cited by examiner

*Primary Examiner*—Janice A. Mooneyham
*Assistant Examiner*—Debra Antonienko

(57) ABSTRACT

An enterprise architecture for a business is divided into a business architecture and an information technology architecture. The business architecture is the main driver for the information technology architecture but the information technology architecture can also have an impact on the construction of the business architecture. A framework tower is built around essential and mandatory components of the enterprise architecture. The framework tower is made up of a plurality of planes representing mandatory components of the enterprise architecture. The components of the framework tower include a strategic plan, a business architecture, an information architecture, an application architecture, a technology infrastructure architecture, an enterprise information technology management architecture, and a security architecture. Each component identifies and categorizes requisite architectural components and elements of a business. Each component in the framework tower addresses the people, processes, and technology of the enterprise architecture so that strategic information technology planning and repeatable and effective information technology enabling solutions can be performed and delivered to the business.

20 Claims, 11 Drawing Sheets

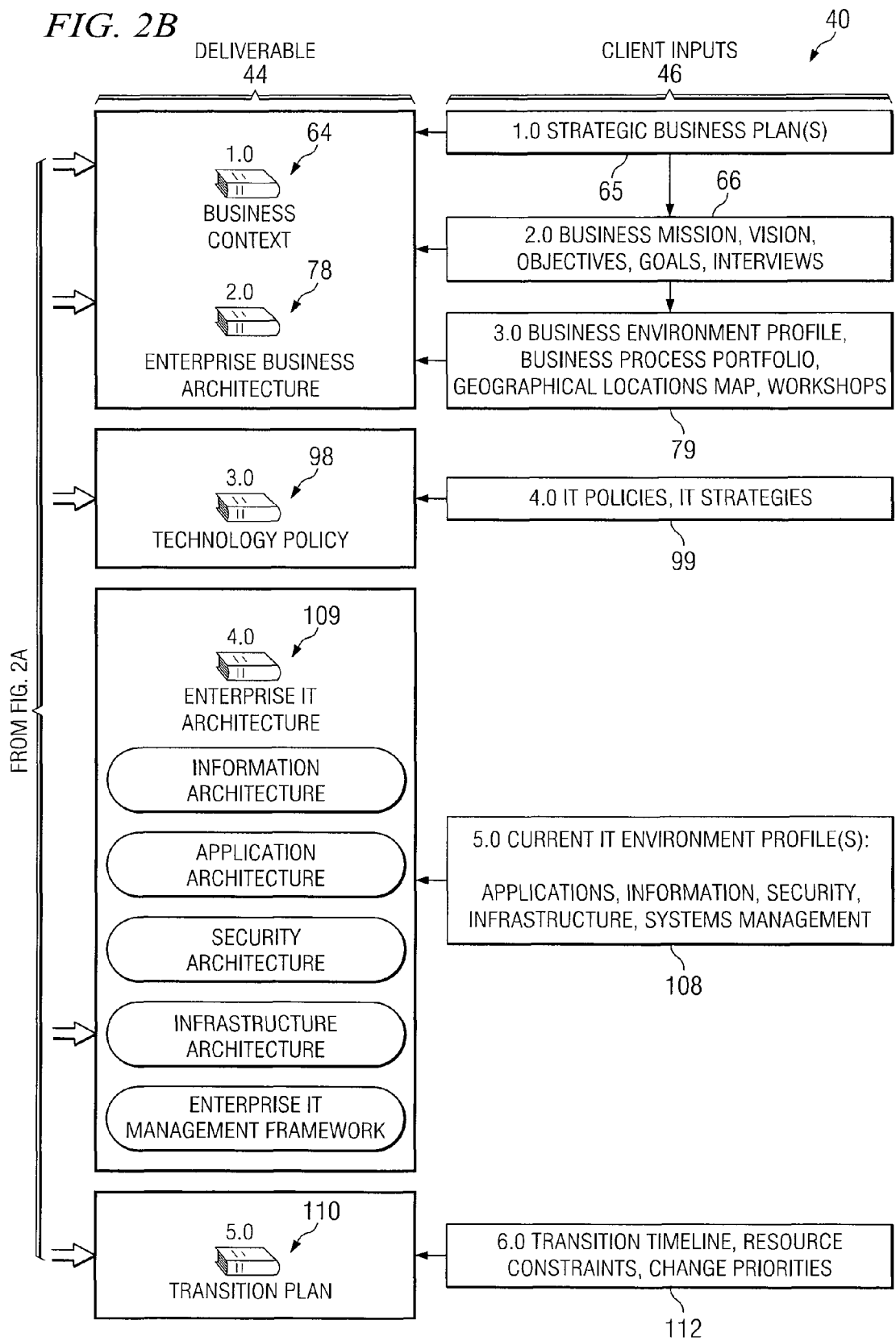

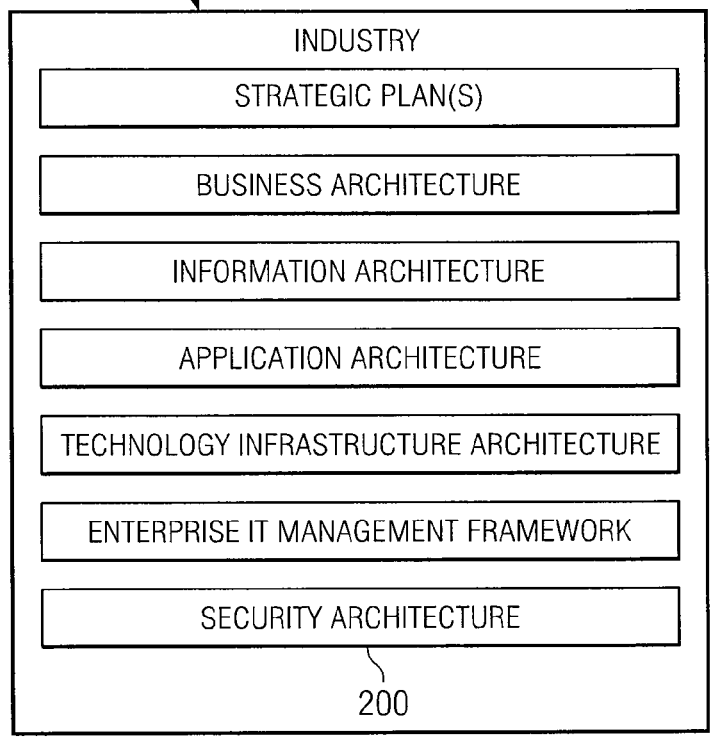
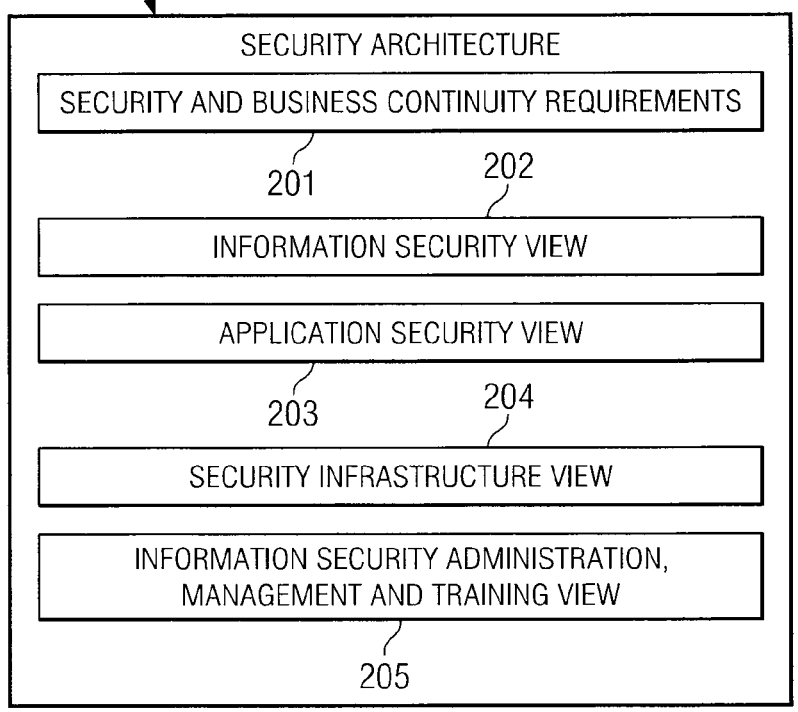

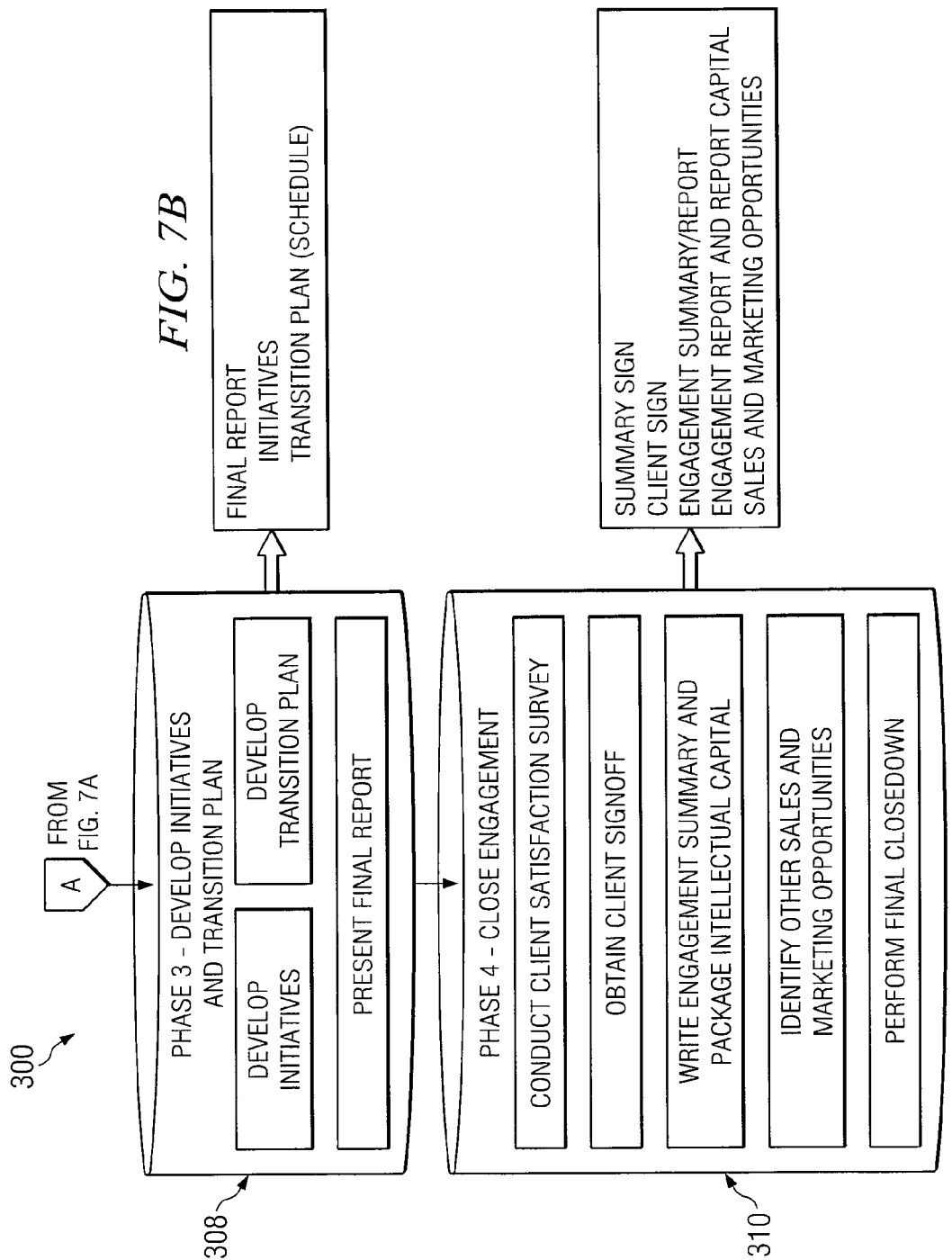

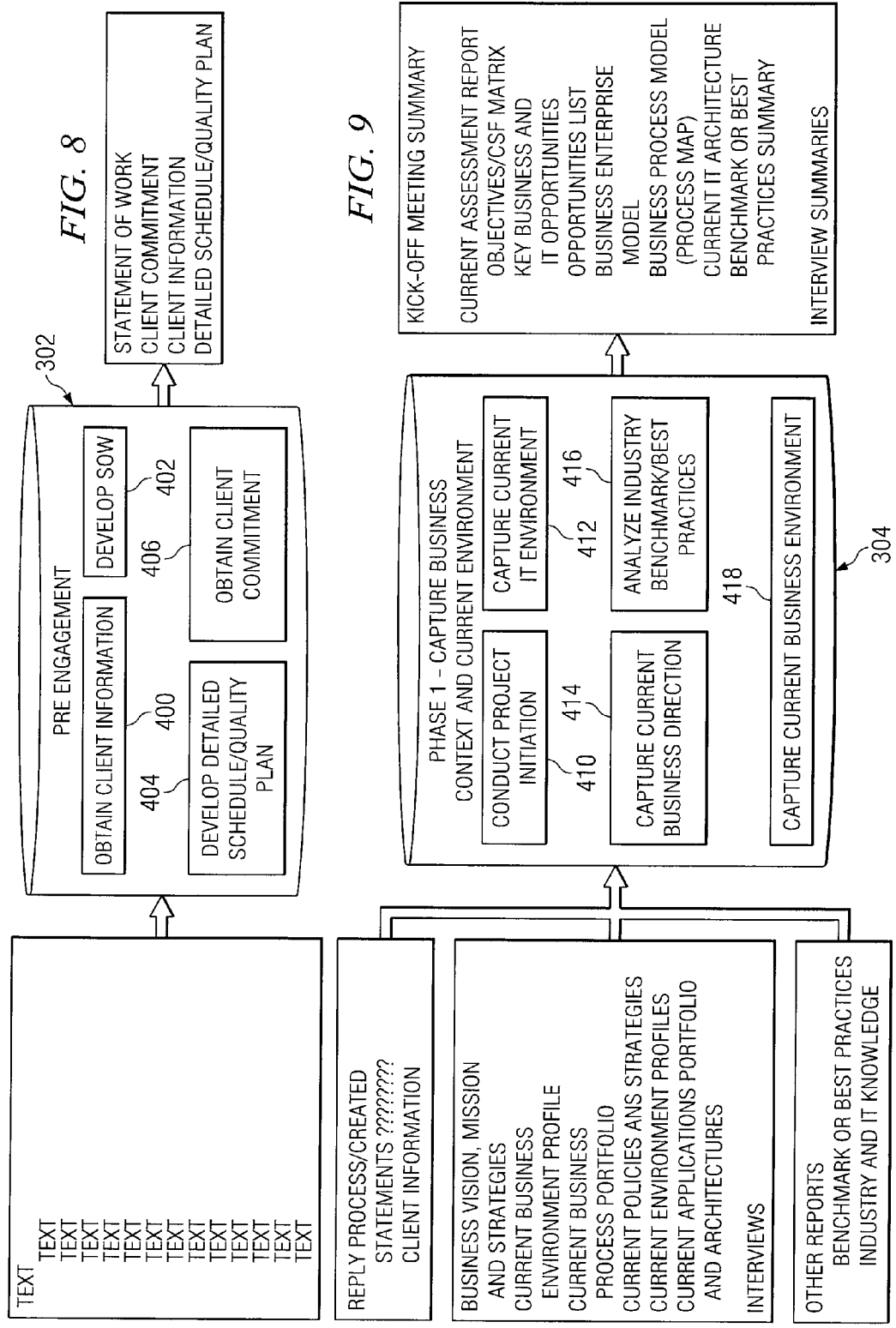

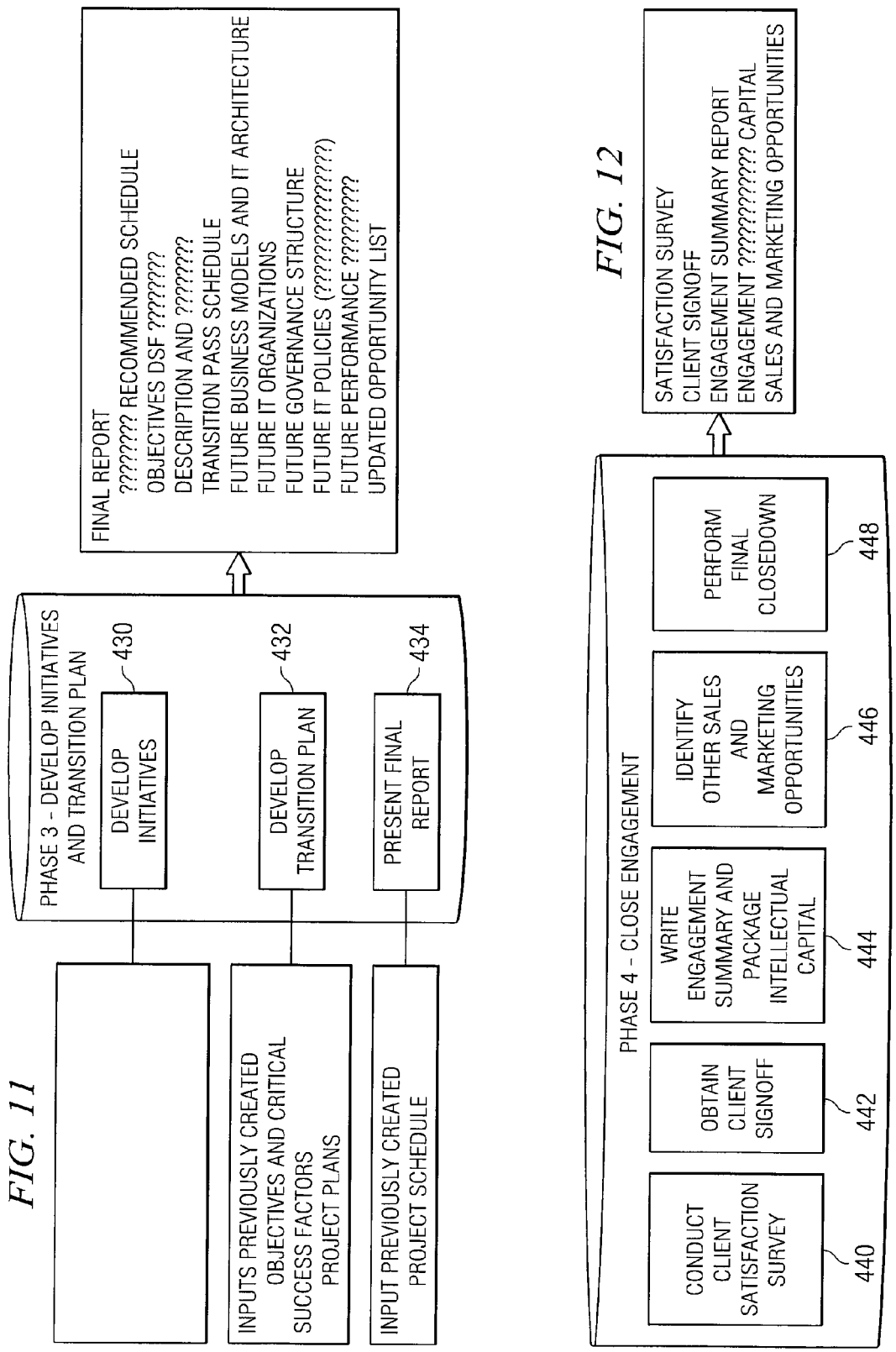

METHOD OF MODELING FRAMEWORKS AND ARCHITECTURE IN SUPPORT OF A BUSINESS

RELATED APPLICATIONS

This application is a continuation-in-part of U.S. application Ser. No. 09/378,514, filed Aug. 20, 1999 now U.S. Pat. No. 7,162,427.

TECHNICAL FIELD OF THE INVENTION

The present invention relates in general to business modeling techniques and in particular to a method of modeling frameworks and architecture in support of a business.

BACKGROUND OF THE INVENTION

In order for an enterprise to align and enable business resources, there must be an assessment, identification, construction, modification, enhancement, and integration of business and information technology components. However, most enterprises lack a basis from which strategic information technology planning approaches can be derived and developed to deploy requisite business and information technology components. Thus, a business is not able to ensure a successful information technology enablement of cross functional business processes into end-to-end activities. There is no mechanism in the industry for a foundation that provides essential integrated business and information technology reference models necessary for defining, constructing, or assessing an enterprise architecture. There is no common benchmark from which business and information technology processes and requirements can be assessed and developed. Therefore, it is desirable to provide a business with a foundation that allows the business architecture to drive the technology architecture and also allow the technology architecture to have a direct impact on the construction of the business architecture through enablement or providing new and creative ways of conducting business.

SUMMARY OF THE INVENTION

From the foregoing, it may be appreciated that a need has arisen for an effective technique to model a business. In accordance with the present invention, a method of modeling frameworks and architecture in support of a business is provided that substantially eliminates or reduces disadvantages and problems associated with conventional business model techniques.

According to an embodiment of the present invention, there is provided a method of modeling frameworks and architecture in support of a business that includes identifying manageable entities of the business. An overall architecture for the business is determined that defines how the manageable entities relate-to each other. The overall architecture is represented in a tower model with seven fundamental components—strategic plan, business architecture, information architecture, application architecture, technology infrastructure architecture, security architecture, and enterprise information technology management framework. Each fundamental plane may include sub-planes to further define the architecture of the business enterprise. A common language is implemented in order to articulate the overall architecture. Technology requirements for the business are analyzed and implemented according to the overall architecture.

The present invention provides various technical advantages over conventional business modeling techniques. For example, one technical advantage is to provide discipline for delivering repeatable and effective information technology enabling solutions to business needs. Another technical advantage is to promote integration of business and technology planning and establishing a technology strategy that both sustains and directs business efforts. Yet another technical advantage is to provide a common model for articulating the mandatory components of an enterprise architecture and the baseline for developing information technology planning and integration approaches. Still another technical advantage is to effectively manage a heterogeneous technology environment. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 illustrates an enterprise strategic information technology planning framework model;

FIG. 5 illustrates a security architecture component in the framework tower representation;

FIG. 8 illustrates a pre-engagement phase of the alignment process model;

FIG. 9 illustrates a first engagement phase of the alignment process model;

FIG. 11 illustrates a third engagement phase of the alignment process model; and FIG. 12 illustrates a fourth phase of the alignment process model.

DETAILED DESCRIPTION OF THE INVENTION

Figure 1:
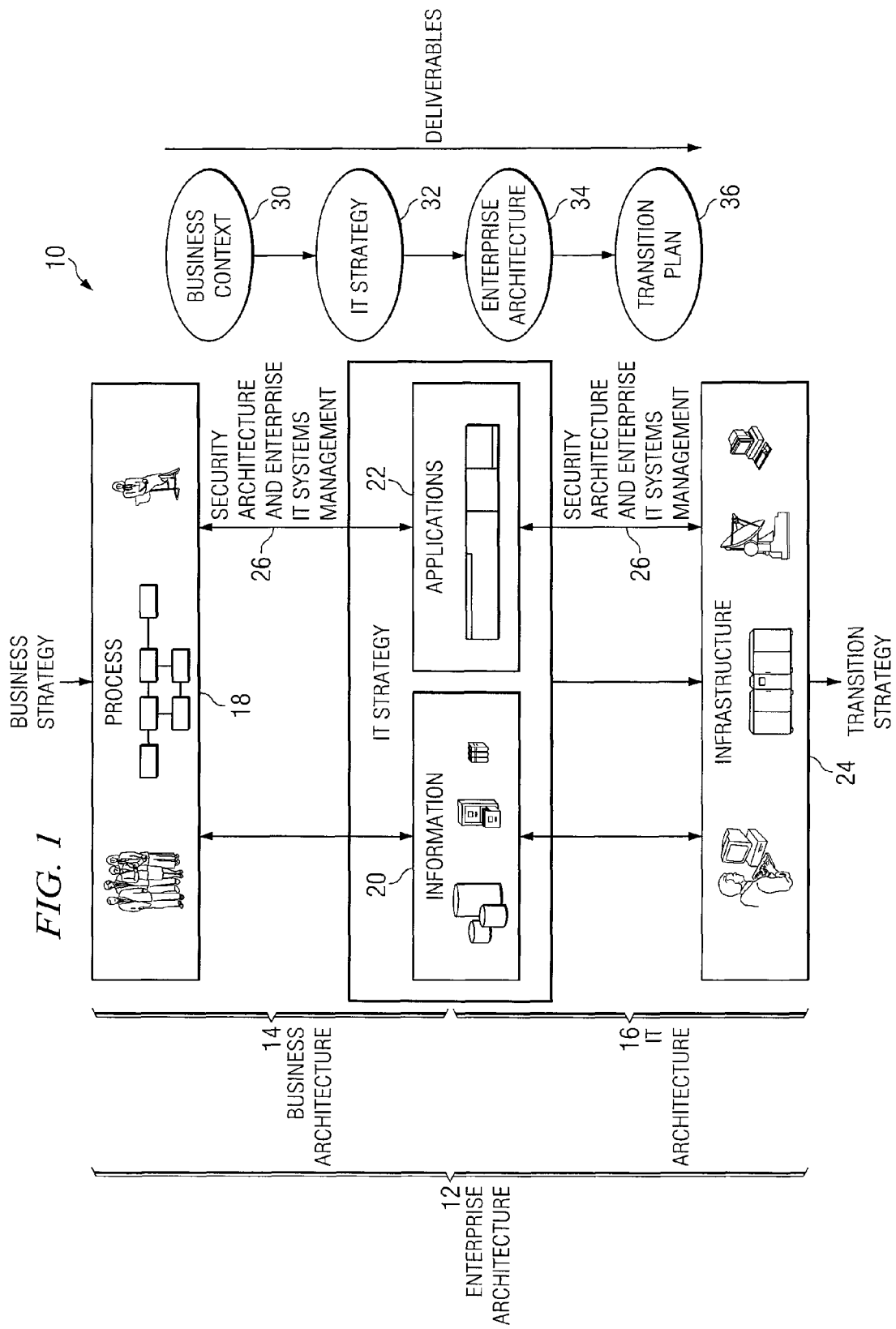
FIG. 1 illustrates a summary for aligning information technology to business strategy.

FIG. 1 shows a summary 10 of how a client can align its information technology to better support its current business strategies. An enterprise architecture 12 for a client includes a business architecture 14 and an information technology architecture 16. Business architecture 14 includes a process layer 18 which is driven by the business strategy and strategic plans of the client. Business architecture 14 establishes an information technology strategy that drives an information architecture 20, an application architecture 22, and an infrastructure architecture 24. Supporting business architecture 14 and information technology architecture 16 is a security architecture 26 as well as enterprise information technology systems management. A transition strategy is developed so that a client's information technology can efficiently and effectively support its business objectives. Different phases in this alignment process support the development of business context 30, information technology strategy 32, enterprise framework 34, and transition plan 36 deliverables.

The alignment process provides the ability to determine whether information technology objectives are in line with a client's business objectives. The client will also be able to determine the business value of existing and future information technology investments and make better information technology investment decisions. An organizational framework for the client can be defined that supports business operations and services and provide a roadmap for the future. The alignment process confirms the proper information technology meets the business needs of the client ensures that business and technology strategies are in sync. The business needs of the client in relation to its information technology investment can be measured and a series of steps to adjust the information technology investment can be identified to meet the client's business goals.

Figure 2A:
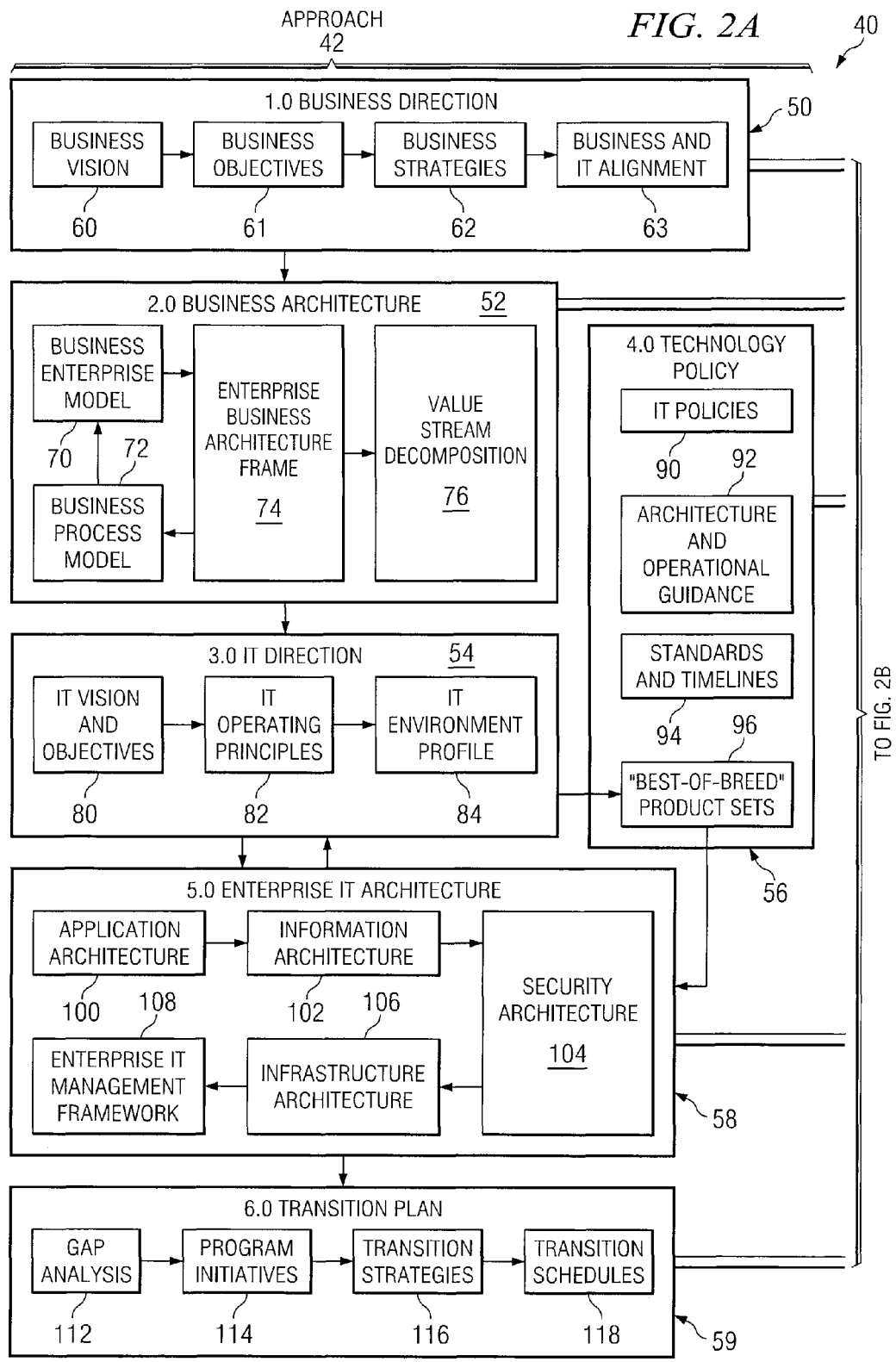
FIG. 2 illustrates a strategic information technology planning philosophy.

FIG. 2 shows the strategic information technology planning philosophy 40 of the present invention. Philosophy 40 follows an approach 42 to provide deliverables 44 in response to client inputs 46. The approach 42 of philosophy 40 includes a business direction leg 50, a business architecture leg 52, an information technology direction leg 54, a technology policy leg 56, an enterprise architecture leg 58, and a transition plan leg 59. Each of these legs of approach 42 are used to develop deliverables 44 according to client inputs 46.

Business direction leg 50 identifies the philosophies of the business. These philosophies include a business vision 60, business objectives 61 business strategies 62, and current business and information technology alignment 63. These philosophies develop a business context deliverable 64 according to a client's strategic business plan input 65 and business mission input 66. Business mission input 66 includes the specific vision, objectives, and goals for the business based on management interviews. Business architecture leg 52 identifies the structure of the business. The structure includes a business enterprise model 70, a business process model 72, an enterprise business architecture frame 74, and value stream decomposition 76. The structure yields an enterprise business architecture deliverable 78 according to a business environment input 79. Business environment input 79 includes an environmental profile, process portfolio, business geographies based on management workshops.

Information technology leg 54 identifies the information technology goals and current state of the business. This is defined by vision and objectives 80, operating principles 82, and environment profile 84. technology policy leg 56 identifies basic characteristics within the technology industry. These characteristics include information technology policies 90, architecture and operational guidance 92, standards and timelines 94, and best of breed product sets 96. Together, information technology direction leg 54 and technology policy leg 56 develop a technology policy deliverable 98 in response to a client's information technology policy and strategy input 99.

Enterprise architecture leg 58 determines an information technology structure. The structure includes an application architecture layer 100, an information architecture layer 102, a security architecture layer 104, an infrastructure architecture layer 106, and an enterprise information technology management framework layer 107. In response to an information technology environmental profile input 108, including applications, information security, infrastructure, and systems management data, an enterprise strategic information technology planning framework model deliverable 109 is created.

Transition plan leg 59 gathers information developed by the other legs in order to establish a transition plan deliverable 110 according to a transition input 111 that includes timeline, resource constraints, and priorities. Transition plan deliverable 110 is developed by transition plan leg 59 through gap analysis 112, program initiatives 114, transition strategies 116, and transition schedules 118.

FIG. 3 shows the enterprise strategic information technology planning framework model 109 provided as a deliverable in philosophy 40. A description of each plane or layer within framework model 109 can be found in U.S. application Ser. No. 09/378,514, U.S. Pat. No. 7,162,427, which is incorporated herein by reference. The present invention improves on the disclosure in the U.S. Pat. No. 7,162,427 by adding a security architecture component 200. Security architecture component 200 provides a mechanism for security measures to be incorporated into the information technology architecture to meet the security objectives of the enterprise.

Figure 4:
FIG. 4 illustrates an enterprise strategic information technology framework tower representation.

FIG. 4 shows the enterprise strategic information technology planning framework tower with sub-planes associated with each plane. The tower has been adjusted to include security architecture plane 200 and its respective sub-planes. The present invention adds security architecture as another fundamental component of the overall enterprise architecture. Security architecture component 200 provides an assessment of the current security environment to include asset list, strategies, policies, practices, frameworks, architectures, services, functions, mechanisms, products, and processes. Based on this assessment, security architecture component 200 establishes security objectives, proposes high level security solutions, and recommends an appropriate mix of security measures.

FIG. 5 shows a detailed view of security architecture plane 200 and each of its sub-planes. Security Architecture plane 200 includes a security and business continuity requirements sub-plane 201, an information security view sub-plane 202, an application security view sub-plane 203, a security infrastructure view sub-plane 204, and an information security administration, management, and training view sub-plane 205. Security architecture component 200 provides best practice guidance for the development of an information security implementation. Security architecture component 200 provides a consistent approach to breaking up the security design task into different topics. Accordingly, security and business continuity requirements 201 provide the necessary inputs for the implementation of information security.

Information security view sub-plane 202 provides authorization of, access for, and control of users and other valid entities accessing information in the enterprise. It deals with incidents, problems, and contingencies in case the information suffers loss of confidentiality, integrity, availability, and accountability. Vulnerabilities and threats to data are identified and handled. Sensitivity and criticality of data is determined and audit trails/logs are created and reviewed. Information security view sub-plane 202 also ensures that data is transmitted in a trusted manner.

Application security view sub-plane 203 performs identification and authentication of users and other valid entities accessing the application. Authorization of, access for, and control of users and other valid entities accessing applications in the enterprise are also provided. It deals with incidents, problems, and contingencies in case the application suffers loss of confidentiality, integrity, availability, and accountability. Vulnerabilities and threats to the application are identified and handled. Application security view sub-plane 203 also ensures communications with the application is trusted and manages the application throughout its lifecycle.

Similarly, security infrastructure view sub-plane 204 performs identification and authentication of users and other valid entities accessing the infrastructure. Authorization and control of access to the enterprise infrastructure by users and other entities are also provided. It deals with incidents, problems, and contingencies in case the infrastructure suffers loss of confidentiality, integrity, availability, and accountability. Vulnerabilities and threats to the infrastructure are identified and handled. Security infrastructure sub-plane 204 also ensures communications with the infrastructure is trusted and manages the infrastructure throughout its lifecycle.

Information security administration, management, and training view sub-plane 205 manages user credentials, keys, and codes, as well as=authorization and access control and domains. Business continuity, disaster recovery, major incidents, threats, vulnerabilities, risks, event management, and problem management are also handled by this sub-plane. This sub-plane also manages audit compliance and assurance, security awareness, and security training programs.

Figure 6:
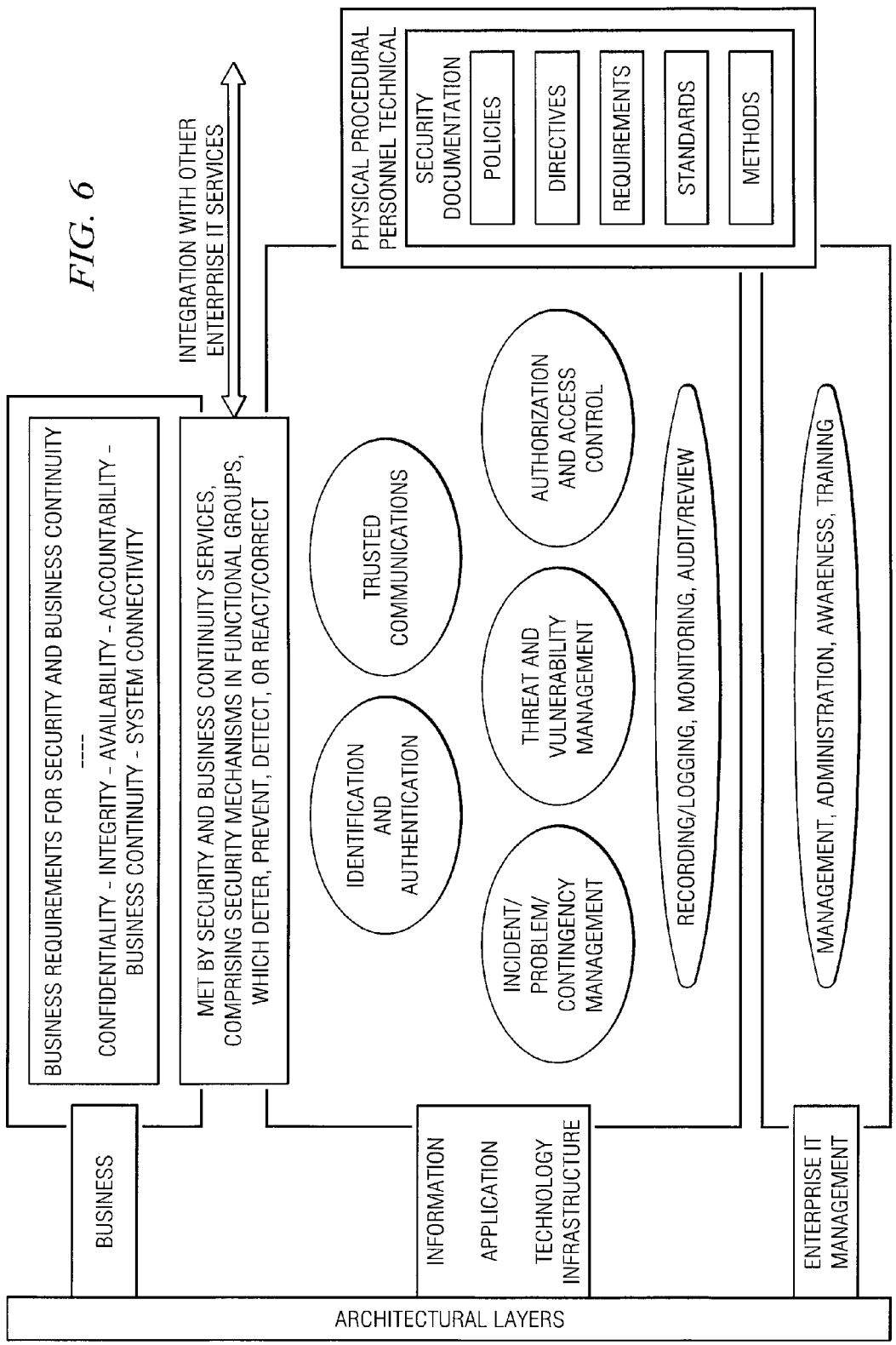
FIG. 6 illustrates an arrangement for the security architecture component.

FIG. 6 shows an arrangement for security architecture component 200. The enterprise's business requirements for security and business continuity are expressed as security objectives for confidentiality, integrity, availability, accountability, business continuity, and system connectivity. Security architecture component 200 guides designers in establishing security objectives, devising security solutions, and selecting an appropriate mix of security measures. These deliverables are aligned with the other architectural layers in the enterprise framework tower. The security architecture framework allows for security relevant business requirements for confidentiality, integrity, availability, and accountability to be placed in the business architecture layer. These requirements are met through a set of security and business continuity services that integrate with other enterprise services. The services are implemented through a documented combination of physical, procedural, personnel, and technical mechanisms. The technical and technology related procedural mechanisms span the information, application, technology infrastructure and enterprise information technology layers with the mechanisms categorized into functional groups.

Security architecture component 200 generates various work products. One work product that may be generated is an assessment of the current security environment. A strategy may be developed for the future security environment based on future business strategy and future information technology strategies. A future security architecture based on future business environment and future information technology architectures may be created. Another type of work product may be an analysis of the gap between current and future security architectures. Finally, a transition plan may also be developed showing defined, prioritized, and scheduled improvement programs, projects and other initiatives.

Figure 7A:
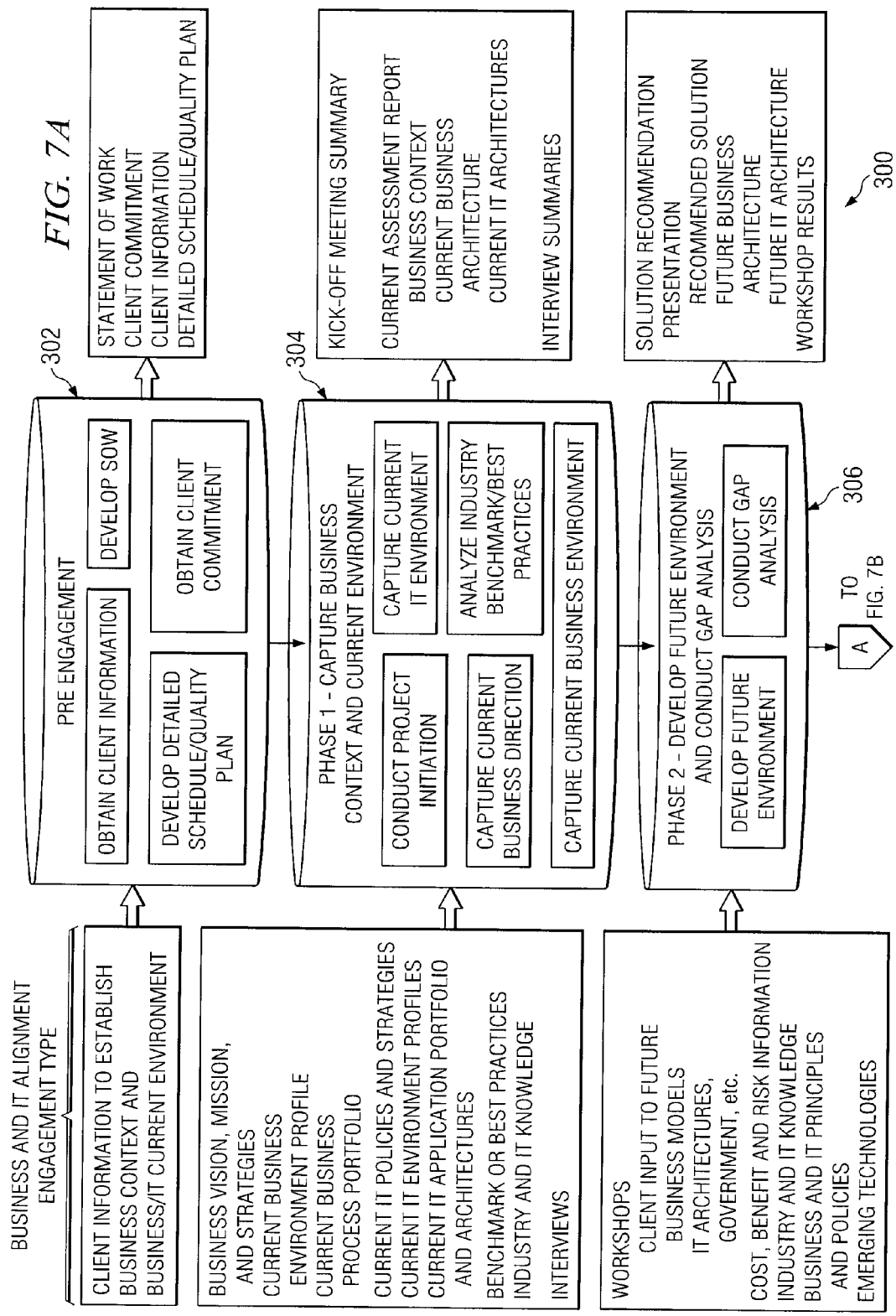
FIG. 7 illustrates a business and information technology alignment process model.

FIG. 7 shows a process model 300 for the business and information technology alignment process. The business and information technology alignment process is an assessment of whether a client's information technology meets its business needs and business strategy. The alignment process provides information technology strategies to address identified gaps and establish a transition plan to close those gaps and align a client's information technology to its business. Process model 300 includes a pre-engagement phase 302, a phase 1 304, a phase 2 306, a phase 3 308, and a phase 4 310.

FIG. 8 shows pre-engagement phase 302. Pre-engagement phase 302 includes the following tasks—Obtain Client Information 400, develop Statement of Work 402, Develop detailed Schedule/Quality Plan 404, and Obtain Client Commitment 406. In pre-engagement phase 302, information about the client business is gathered and a statement of work is developed to establish a clear understanding of the engagement activities and the schedule of events that will take place. A detailed plan is established and the client's commitment is obtained. The best techniques in working with the client are determined in order to take the best approach in gathering information and making recommendations.

Information to gather concerning the business context may include the business's mission and vision statements, strategic plans, documented objectives and goals, and current/planned business initiatives. Business environment information may include the business's products and services description, its customer base, its competitors, its strengths within its industry group, financial information, regulatory environment, organizational charts, and business process maps. Information technology information to gather may include its information technology strategic plan, list of key applications (including interfacing applications, processing mode and frequency, development tools, programming language, operating system, and hardware type), information technology architectures (including application architectures, infrastructure architectures, network diagram, and information architectures), information technology policies and standards, information technology expenditures, and current/planned information technology initiatives.

Prior to starting the engagement, an agreement should be reached with the client business as to the scope of the work and the client's involvement. Interviews, meetings, and workshops are coordinated through the client and the types of people required are identified. To maintain confidentiality, nondisclosure agreements may be established. Pre-engagement activities include obtaining as many relevant documents as possible concerning the business.

Once the scope of work has been agreed upon, a detailed schedule and quality plan is developed. The schedule should be in sufficient detail to adequately define the work activities in terms of days required to accomplish each task and reflect interdependencies of activities. The quality plan addresses the activities undertaken to ensure engagement deliverables meet or exceed client expectations. Elements of the quality plan include VRB to review the scope of work, costs, and risks involved, roles and responsibilities related to engagement issues, internal reviews of key deliverables to promote discussion and incorporate comments, delivery of key deliverables to solicit feedback and confirm acceptance, management status reports and risks associated with the engagement as well as mitigation of risks.

FIG. 9 shows phase 1 304 where the engagement activities begin. Here, the purpose is to capture the current business environment and direction together with the current information technology environment. Phase 1 304 includes the following tasks—Conduct Project Initiation 410, Capture Current Information technology Environment 412, Capture Current Business Direction 414, Analyze Industry Benchmarks and best practices 416, and Capture Current Business Environment 418. During this phase, a good understanding of the current business direction and current business environment is obtained so that this information can be used to determine the future environment and develop future initiatives and strategic plans. Deliverables from the pre-engagement phase 302 as well as management interviews are inputs into phase 1 304. Interviews are conducted during this phase to confirm understanding of information already gathered. The review of all gathered information and interviews culminates in a current assessment report. The current assessment report may include engagement objectives, critical success factors, key business and information technology opportunities, current business architecture (including business enterprise model and business process model/maps), current information technology architectures, and industry benchmark or best practices summary. In addition, the following may be developed and included in the current assessment report—business function process model element of the business architecture, logical location model element of the business architecture, list of key applications, application/function matrix, functional versus technical quality of applications and infrastructure, business SWOT (strengths, weaknesses, opportunities, and threats), and competitive environment.

In the Conduct Project Initiation 410 task, an introduction of the engagement is provided to the client. An agreement is worked out as to work schedules and concurrence is reached on scope, deliverables, roles, responsibilities, risks, and risk mitigation strategies. Key inputs for this task include client information from pre-engagement phase 302, the statement of work, the detailed proposed schedule, and examples of deliverables expected during the engagement. a kick-off session is held with the client and a Kick-off Summary Report is generated. The Kick-off Summary Report includes a final detailed schedule for interviews and workshops, a summary of risks and risk mitigation strategies, and key comments of client personnel.

In the Capture Current Business Direction 412 task, a clear understanding of the client's current business direction is established in order to determine the future business direction for the client to be included in the Current Assessment Report and forming a basis for the future information technology environment. The key inputs for this task include client information from pre-engagement phase 302 (such as mission and vision, business strategic plans, current and planned business and information technology initiatives, information technology strategic plans, business objectives, business goals, and organizational charts), critical success factors, business SWOT, and competitive environment. These key inputs are validated and analyzed and included in the Current Assessment Report. The deliverables from this task include an objectives and critical success factors matrix that will serve as input to sequencing of later identified initiatives, an Opportunities List identifying any business or information technology opportunities raised during this task, and summaries of the interviews to be used for future reference purposes.

In task Capture Current Business Environment 414, a clear understanding of the current business environment is established for inclusion in the Current Assessment Report. Later in the engagement, the gaps between the current business environment and the future business environment will drive the need for initiatives as part of the information technology strategy. The key inputs to this task include organizational charts, business objectives/goals/measurements, current and planned business initiatives, business enterprise model, business function model, business process model, and logical location model. Business management personnel are used to validate and create these inputs as well as to obtain their perspective of how well information technology supports their business functions. Deliverable development in this task for the Current Assessment report include the business architecture (with the business enterprise model, business function model, business process model, and logical location model), updated Opportunities List, interview summaries with functional capabilities of applications from a perspective of meeting business needs, and an application/function matrix.

In task Capture Current Information Technology Environment 416, a clear understanding of the current information technology environment is established for inclusion in the Current Assessment Report. Later in the engagement, gaps between current information technology environment and that needed to support the proposed future business environment will drive the need for initiatives as part of the information technology strategy. Key inputs to this task include current and planned information technology initiatives, a list of key applications, the information technology architecture (including application, infrastructure, information, and security architectures), information technology policies or standards, and information technology expenditures associated with maintaining various information technology applications and infrastructure. Key information technology personnel are interviewed to validate and create these inputs. Technical evaluations of key applications and infrastructure from an information technology maintenance and development perspective are performed. Security policies addressing areas such as network intrusion, firewall configuration, antivirus tools and strategies, and remote access capabilities are identified and created. Configuration and support capabilities (such as workstation standards, asset management tools used to monitor workstation configurations, software licensing management, and help desk support) are reviewed and established. Storage management policies addressing areas such as backup, recovery, data retention, and archives are analyzed in this task. Deliverable from this task to be included in the Current Assessment Report include current information technology architecture (with application infrastructure, information, enterprise information technology management or information technology systems management, and security architectures), geographical location model, a list of key information technology applications, an updated application/function matrix, a functional versus quality assessment of applications and infrastructure, an updated Opportunities List, summaries of interviews to include technical capabilities of applications and network.

In task Analyze Industry Benchmarks and Best practices 418, the best practices and benchmarks for the industry are determined to support recommended solutions to the client. Key inputs to this task include industry and information technology information gained over time and experience, industry documents related to benchmarks and best practices, industry web sites, and library resources. Information relating to industry benchmarks and best practices related to the client's needs and environment are summarized into a Best Practices Summary.

Figure 10:
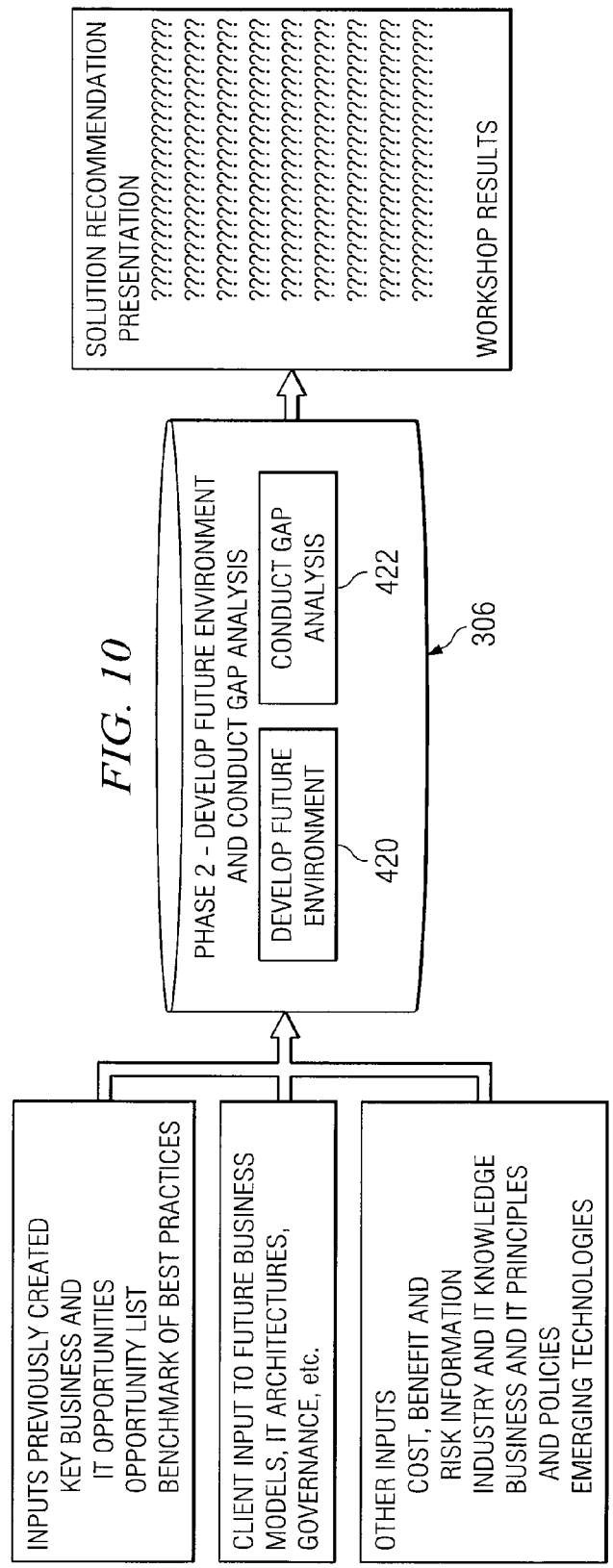
FIG. 10 illustrates a second engagement phase of the alignment process model.

FIG. 10 shows phase 2 306. For phase 2 306, a proposed solution for the future information technology environment is developed for which initiatives can be identified and a transition plan created. Phase 2 306 includes the tasks of Develop Future Environment 420 and Conduct Gap Analysis 422. The key inputs for this phase include key business and information technology opportunities data from the opportunities list applied to current business models/process maps, benchmark or best practices data (including summary of best practices if developed earlier), information technology knowledge of industry business and practices, business and information technology principles and policies, and emerging technologies. Inputs from the client are gathered during a workshop session for future business models, information technology architectures, and governance. Elements such as the drafting of a future business architecture with process models or an enterprise model, future information technology architectures (taking into account applications, infrastructures information, and enterprise information technology management or information technology systems management, and future performance measures may be gathered during the workshops.

From the inputs, various future options or scenarios are analyzed for a future information technology environment. Concurrence with the client should be obtained on future options or solutions. Costs, benefits, and risks associated with alternatives are identified and compared. For multiple alternatives, a recommendation should be made with supporting justifications. Prior to presenting the Solution Recommendation Report to the client, an internal review may be conducted in order to analyze the report and incorporate any comments. If only one alternative solution exists, then deliverables associated with this phase may be included in the Final Report. Enhancements to the opportunities list are also made in this phase. The Solution Recommendation Report may include future business and information technology architectures for the recommended solution, an enterprise information technology management framework with a future information technology organization and governance structure, high level changes for future information technology policies, future performance measures, the recommended solution and justification along with costs/benefits/risks, comparison of costs/benefits/risks associated with various alternatives, and an updated opportunity list.

For the task of Develop Future Environment 420 in phase 2 306, depictions of future business and information technology architectures are developed and reviewed based on the understanding of the current business and information technology environment and the future business direction. Outputs from the pre-engagement phase 302 and phase 1 304 are used as inputs for phase 2 306. A strawman of each future business architecture is developed having key cross functional processes identified, links to business objectives, information required to support the processes determined, and business event metrics captured.

The application portion of the strawman provides a logical portfolio of applications for supporting the various business processes of an enterprise, provides a graphical view of the key applications and the interrelationships, and is designed to illustrate the optimum distribution of applications and components across multiple business functions, processes, sites, and platforms for enabling business workflow scenarios that will insure efficient and effective business operations. The infrastructure portion of the strawman enables access to information and provides support for the execution of activities, contains the standards and policies or 'building codes' for infrastructure construction, contains the logical location software deployment schemas as well as characterisation of the infrastructure environment to provide the base line for the target environment, and provides identification and views of the future logical location layouts with IT platform operating requirements and characteristics that will provide the basis for engineering blueprints and deployment.

The information portion of the strawman represents what information must be delivered to individuals across the enterprise to help them effectively execute business processes and make informed decisions and can be used to show relationships between various data entities. The enterprise information technology management or information technology systems management portion of the strawman identifies the logical organisational functions and systems that need to operate and integrate together, portrays the enabling operational elements, processes, and technology components for achieving the desired delivery of services results based on the corporation's business goals, objectives, critical success factors, and performance metrics that have been documented in Service Level Agreements, and highlights the system management requirements for ensuring that system performance is achieved, the highest reliability level of the enterprise information system is attained, and information services delivery are met based on Service Level Agreements. Some System Management Scenarios include setting information technology service expectations, monitoring information technology, responding to information technology situations and analysing information technology services.

Future performance measures are also developed for discussion. Characteristics of performance measures include supporting objectives and critical success factors, providing an ability to monitor progress toward expectations, defining the criteria as to what is to be measured and how, and developing targets to show what the expected or desired results are to be and when they will be achieved. The strawman depictions and the performance measures are presented to the client for validation before proceeding with the engagement. Upon validation, a summary is developed to document key comments. In addition, the strawman depictions are developed and reviewed and additional opportunities for improvement may be identified. The additional opportunities are used to update the Opportunity List.

For the task of Conduct Gap Analysis 422 in phase 2 306, changes required to go from the current business environment to the future business environment are determined from the Opportunities List and the Cost/Benefit/Risk data. A recommended information technology architecture is selected and changes that require implementation by the organization are identified. Any gaps not already identified in the Opportunity List are determined and the Opportunity List is appropriately updated. Changes to the information technology organization, governance structure, and policies to support the future information technology architecture are identified. Performance measures required for the future environment are provided and costs/benefits/risks associated with various identified opportunities are determined. As the task proceeds, any gaps and cost/benefit/risk analysis may require minor revisions or enhancements to the strawman depictions developed in the previous develop future environment task. Revisions and enhancements are identified to ensure that future architectures are still consistent with those presented in the previous task, ensure the correct information is obtained to support analysis of the architectures for determining a solution, and minimize the time required to develop a final solution architecture at the end of this task. Though changes to policies, organization, and governance can be identified in this phase, this information may be provided in the next phase as it will not usually effect the recommendation decision. An information technology architecture is recommended and the Solution Recommendation Report is generated.

FIG. 11 shows phase 3 308. Phase 3 308 provides a final report that includes future business models, future business architectures, and a transition plan schedule to get there. Phase 3 308 includes the task of Develop Initiatives 430, Develop Transition Plan 432, and Present Final Report 434.

For task Develop Initiatives 430, opportunities are grouped by initiatives and project plans are developed for the initiatives. Cost/benefit/risk, timeframe, and project interdependencies are determined for the initiatives. The key risks to be considered include the ability to implement, complexity of the initiative, the timeframe to implement, and overload of change to targeted parts of the organization. initiatives may be phased around demonstrable business value in seeking to reduce complexity, risk, and timeframe to deliver.

The key inputs to this task are the comparison of cost/benefit/risk associated with various alternatives and the enhanced Opportunity List from the Solution Recommendation Report. Similar opportunities are grouped by initiatives while looking for synergies across opportunities. While many of the initiatives will be associated with information technology activities as part of the information technology strategy, the initiatives need not be limited to information technology initiatives. The initiatives can include activities such as business processing re-engineering, organizational change, and change management to support execution of the information technology strategy. The deliverable from this task is the project plan for the initiative that may include the scope of the project, the high level activities required to implement the project, the timeframe to implement and start accruing benefits, Resources required to implement the project, costs/benefits/risks associated with the project, interdependencies with other projects, and performance measures to assess the success of the project.

For the task Develop Transition Plan 432, the initiatives are sequenced into a project schedule or transition plan. The key inputs for this task include objectives and critical success factors, the initiatives, and the project plans. The sequence of initiatives are determined based on the objectives and critical success factors, the timing of demonstrable business value, costs/benefits/risks associated with the initiatives, and interdependencies of initiatives to include the availability of an information technology infrastructure to support the initiatives. The transition plan may include initiatives other than those that are information technology based. The transition plan is developed with a phase based timeline according to the sequencing of the initiatives. and includes the Opportunity List with initiatives grouped by phases.

For the task Present Final Report 434, a Final Report is generated for the client which represents the culmination of the engagement and provides an information technology strategy for implementation. The key inputs for this task include all previously created deliverables, especially the objectives and critical success factors, the Solution Recommendation Report, the project plans, the transition plan, and the final Opportunity List grouped by initiatives and phases. The Final report summarizes the recommended solution and presents the future business and information technology architectures and associated transition plan schedule for achieving information technology alignment to the future needs of the business. Prior to presentment to the client, an internal review of the Final Report is conducted for accuracy, to ensure what future opportunities may exist with the client, and that no conflicts are occurring with the client. Any feedback from the client is incorporated into the Final Report.

FIG. 12 shows phase 4 310. Phase 4 310 provides the final set of activities to close the engagement with the client. Phase 4 310 includes the tasks of Conduct Client Satisfaction Survey 440, Obtain Client Signoff 442, Write Engagement Summary 444, Identify Other Sales/Marketing Opportunities 446, and Perform Final Closedown 448. The client satisfaction survey is used to obtain feedback from the client as to how valuable the services were to the client. Obtaining signoff from the client ensures that the project is completed and there are no further expectations of the engagement. Engagement documentation may be packaged for archive and delivery to the client for ownership and implementation. Final close down activities are performed to include returning all client property and access mechanisms, finalizing all financials, and conduct engagement reviews.

The inputs for each phase of alignment process model 300 may be setup as templates within a computer application to facilitate ease of entry and use within individual tasks. The computer application may be set up to generate deliverables from each task based on appropriate inputs provided into alignment process model 300. In this manner, the alignment process can be streamlined and automated in order to effectively provide the alignment service for a client. The computer application may provide graphical representations of the various architectures associated with the business as well as the deliverables generated during the alignment process.

The Enterprise Strategic information technology Planning Framework Tower is the starting point for determining the context and mandatory, major components and methods needed to develop a strategic information technology plan and consequently build information technology solutions for a successfully enabling an enterprise. The Tower will help information technology personnel to effectively analyze and evaluate business and technology requirements, put them in their proper context, and ensure that due consideration has been given to all of the architectural components needed to support business needs and requirements. In addition the Tower will help achieve the goals of defining and embodying a value proposition and intellectual capital based on experience and success, ensuring consistency of delivery and integration of results, ensure specificity in definition but not in a prescriptive "cookbook" approach, and allowing tailoring to individual and unique client requirements but building from a foundation of "best practices".

The deliberate approach and modeling of a strategic planning process using the Enterprise Strategic information technology Planning Framework Tower, blueprints, work pattern approaches, and graphical story boards will insure that the development of a strategic information technology plan will be reasonable, executable, and useful. The strategic information technology plan's implementation will provide the framework and process for defining the vision, mission, and long term objectives for information technology and aligning them with the business, the strategies for achieving them, and the architectures to enable them. The strategic information technology plan's implementation provides the context and guidance that drives the definition of integrated business and information technology systems (in support of business processes and functions), organization structure, and information technology solution sets for products and services. The strategic information technology plan also determines the actions and parameters for the allocation of resources to meet the objectives and allows for a deliberate, planned, and effective utilization of an enterprise's investment in time and resources.

Thus, it is apparent that there has been provided, in accordance with the present invention, a method of modeling frameworks and architecture in support of a business that satisfies the advantages set forth above. Although the present invention has been described in detail, various changes, substitutions, and alterations may be readily ascertainable by those skilled in the art and may be made herein without departing from the spirit and scope of the present invention as defined by the following claims.

What is claimed is:

1. A method of computer modeling integrated business and information technology frameworks and architecture in support of a business, comprising:

identifying, in a computer, manageable entities of the business and an existing information technology supported by each manageable entity;

generating, by the computer, an overall architecture for the business, the overall architecture defining how the manageable entities relate to each other and to the existing information technology, wherein the overall architecture contains a plurality of components, the plurality of components including a strategic plan, a business architecture, an information architecture, an application architecture, a technology infrastructure architecture, a security architecture, and an enterprise information technology management framework;

implementing, in the computer, a common language in order to articulate the overall architecture; and generating, by the computer, a graphical representation of the overall architecture for the business according to the common language;

determining, by the computer, information technology requirements for the business in response to the existing information technology and the relationship among the manageable entities; and generating, by the computer, a plan for implementation and deployment of future information technology among the manageable entities based on the determined information technology requirements for display by the computer within the graphical representation of the overall architecture, the plan including a future security architecture based on the future information technology and a transition between a current security architecture and the future security architecture, wherein each of the current security architecture and future security architecture includes a corresponding set of a security objective and a mix of security measures.

2. The method of claim 1, wherein the overall architecture addresses people, processes, and technology of the business.

3. The method of claim 1, wherein the strategic plan component includes a business plan, a product plan, a financial plan, an organization plan, a marketing plan, and a future information technology plan in support of the aforementioned plans.

4. The method of claim 1, wherein the business architecture component defines current business direction, objectives, and supporting processes as well as future direction, objectives, and supporting processes.

5. The method of claim 1, wherein the information architecture component provides information and data management precepts, an information-application software portfolio, and a geo-structural view of existing and future information technology deployment.

6. The method of claim 1, wherein the application architecture component defines an application software portfolio and integration relationships for the manageable entities of the business.

7. The method of claim 1, wherein the technology infrastructure architecture component enables access to information and geo-structural layouts for the existing and future information technology.

8. The method of claim 1, wherein the security architecture component describes how security measures fit into the overall architecture of the business to meet security objectives of the business.

9. The method of claim 1, wherein the enterprise information technology management framework component provides existing and future information technology services and products, management of the services, information technology systems and network management, and enterprise information technology management organization capabilities, competencies, skills, and performance models.

10. The method of claim 1, further comprising:
decomposing, by the computer, the manageable entities so that each manageable entity has a relative independence from other manageable entities but is in context with the overall enterprise architecture.

11. The method of claim 1, further comprising:
analyzing industry benchmarks relating to information technology practices, wherein generating the plan is further based on analyzing the industry benchmarks relating to information technology practices.

12. A computer readable medium including code for modeling integrated business and information technology frameworks and architecture in support of a business, the code executable on a computer to:

receive data associated with manageable entities of the business and existing information technology supported by each manageable entity;

generate an overall architecture defining how manageable entities of the business relate to one another and to the existing information technology, the overall architecture including:

a strategic business plan component providing context and guidance that drive definition of business functions, processes, systems, and organization;

a business architecture component reflecting what the business does in the present as well as in the future to accomplish particular business requirements;

an information architecture component representing what information is to be delivered to individuals across the business;

an application architecture component supporting business process execution and information flow;

a technology infrastructure architecture component supporting execution of activities and defining what information technology components are needed to enable access to information;

a security architecture component describing how security measures fit into the overall architecture of the business to meet security objectives of the business;

an enterprise information technology management architecture component dealing with business and organizational management of providing information technology services and products as well as systems, network, and element management;

generate a plan for implementation and deployment of future information technology among the manageable entities pursuant to the components of the overall architecture in response to how the manageable entities relate and to the existing information technology, the plan including a future security architecture based on the future information technology and a transition between a current security architecture and the future security architecture, wherein each of the current security architecture and future security architecture includes a corresponding set of a security objective and a mix of security measures.

13. The computer readable medium of claim 12, wherein the security architecture component includes security and business continuity requirements, an information security view, an application security view, a security infrastructure view, and an information security administration/management/training view.

14. The computer readable medium of claim 13, wherein the information security view is responsible for supervision of data within the overall architecture of the business.

15. The computer readable medium of claim 13, wherein the application security view is responsible for the supervision of applications within the overall structure of the business.

16. The computer readable medium of claim 13, wherein the security infrastructure view is responsible for supervision of an infrastructure within the overall architecture of the business.

17. The computer readable medium of claim 13, wherein the information security administration/management/training view is responsible for managing access and recovery of data within the overall architecture of the business.

18. The computer readable medium of claim 13, wherein the security and business continuity requirements provide inputs for implementing information security within the overall architecture of the business.

19. The computer readable medium of claim 13, wherein the code is further executable to:

graphically displaying the overall architecture of the business;

graphically displaying how the future information technology is to be implemented and deployed within the overall architecture in response to the generated plan.

20. The computer readable media of claim 12, wherein the code is executable to further:

analyze industry benchmarks relating to information technology practices, wherein generating the plan is further based on analyzing the industry benchmarks relating to information technology practices.

\* \* \* \* \*